United States Patent [19]

Price et al.

[11] Patent Number: 5,063,527

[45] Date of Patent: Nov. 5, 1991

[54] MONITOR SYSTEM

[75] Inventors: Barry L. Price, Christopher J. Thornhill, both of Solihull, England

[73] Assignee: British Gas plc, London, England

[21] Appl. No.: 500,232

[22] Filed: Mar. 26, 1990

Related U.S. Application Data

[63] Continuation of Ser. No. 149,527, Jan. 28, 1988, abandoned.

[30] Foreign Application Priority Data

Jan. 29, 1987 [GB] United Kingdom ............... 8701964

[51] Int. Cl.[5] ............................................. F23Q 23/00
[52] U.S. Cl. ................................... 364/550; 364/184; 431/24
[58] Field of Search ............... 364/550, 551.01, 551.02, 364/184–186, 477, 474.19; 340/310 A, 825.06, 825.07, 825.08; 371/49.1, 3; 431/18, 24, 26

[56] References Cited

U.S. PATENT DOCUMENTS

| | | | |
|---|---|---|---|
| 3,701,113 | 10/1972 | Chace et al. | 264/200 |
| 3,829,842 | 8/1974 | Langdon et al. | 364/184 X |
| 3,978,454 | 8/1976 | Willard | 455/1 |
| 4,075,707 | 2/1978 | Wilmer | 364/900 |
| 4,095,094 | 6/1978 | Struger et al. | 364/900 X |
| 4,101,258 | 7/1978 | Jacobsz | 431/26 |
| 4,107,649 | 8/1978 | Kurihara | 371/3 |
| 4,117,317 | 9/1978 | Dooley, Jr. et al. | 371/68 |
| 4,275,464 | 6/1981 | Schmidt | 364/186 X |
| 4,276,603 | 6/1981 | Beck et al. | 364/477 |
| 4,412,280 | 10/1983 | Murphy et al. | 364/200 |
| 4,414,669 | 11/1983 | Heckelman et al. | 371/49 |
| 4,488,300 | 12/1984 | Horey et al. | 364/900 X |
| 4,507,784 | 3/1985 | Procter | 371/3 |
| 4,511,975 | 4/1985 | Nozawa et al. | 364/185 X |
| 4,520,482 | 5/1985 | Fourré et al. | 364/184 X |
| 4,558,416 | 12/1985 | Pauwels et al. | 364/900 X |
| 4,567,556 | 1/1986 | Onogi et al. | 364/140 |
| 4,633,384 | 12/1986 | Kusumi | 364/184 |
| 4,636,949 | 1/1987 | Longabaugh | 364/184 X |
| 4,644,479 | 2/1987 | Kemper et al. | 364/184 X |
| 4,649,469 | 3/1978 | Gabillet | 364/130 |
| 4,670,876 | 6/1987 | Kirk | 371/3 |
| 4,740,888 | 4/1988 | Ceste, Sr. et al. | 364/477 X |
| 4,745,542 | 5/1988 | Baba et al. | 364/184 |
| 4,749,992 | 6/1988 | Fitzemeyer et al. | 340/310 A |
| 4,827,397 | 5/1989 | Arensmeier et al. | 364/186 |
| 4,852,046 | 7/1989 | Jones et al. | 364/184 |
| 4,931,975 | 6/1990 | Gleason, III et al. | 431/26 X |

FOREIGN PATENT DOCUMENTS

| | | |
|---|---|---|
| 0115994 | 8/1984 | European Pat. Off. . |
| 0155213 | 9/1985 | European Pat. Off. . |
| 2258660 | 8/1975 | France . |
| 2275819 | 1/1976 | France . |
| 2117122 | 3/1982 | United Kingdom . |
| 2139782 | 11/1984 | United Kingdom . |

OTHER PUBLICATIONS

Williams, T. J., "The Development of Reliability in Industrial Control Systems", *IEEE Micro*, Dec. 1984, pp. 66–80.

Primary Examiner—Joseph L. Dixon
Attorney, Agent, or Firm—Oblon, Spivak, McClelland, Maier & Neustadt

[57] ABSTRACT

A monitor system for safety critical situations such as burner control receives at inputs 17-21 control information from a programmable logic control and reference information at inputs 12-16 from plant interlocks. This information passes via opto-isolators 40 and buffers 41 to the address bus of an EPROM so as to access information stored therein which normally mirrors the PLC information so as to control relays RL1-5 via drivers 45 to conform to the PLC instructions. The EPROM also contains reset and clock information for use by a counter 48 which allows different areas within the EPROM to be accessed. The reset information is also available to a parity check circuit 49 via oscillator 46 for dynamically testing the monitor for integrity of operation. Failure of the PLC or monitor components will cause access to shutdown addresses of the EPROM and operation of the appropriate relays including lockout relay RL6.

30 Claims, 17 Drawing Sheets

FIG. 5.

| Stage | Period T | Main | Pilot | Ign | Fan | Flame | Alarm | APS | Stat |
|---|---|---|---|---|---|---|---|---|---|
| Shutdown | 0 | 0 | 0 | 0 | 0 | 0 | 0 | 0 | X |
| Start | 1 | 0 | 0 | 0 | X | 0 | 0 | 0 | 1 |
| Purge | 2 | 0 | 0 | 0 | 1 | 0 | 0 | X | 1 |
| Proven-Purge | 3 | 0 | 0 | X | 1 | 0 | 0 | 1 | 1 |
| Pilot-Ignition | 4 | 0 | X | 1 | 1 | X | 0 | 1 | 1 |
| Pilot-Proving | 5 | 0 | 1 | 0 | 1 | 1 | 0 | 1 | 1 |
| Main-Ignition | 6 | 1 | 1 | 0 | 1 | 1 | 0 | 1 | 1 |
| Main-Run | 7 | 1 | 0 | 0 | 1 | 1 | 0 | 1 | 1 |
| Post-Purge | 8 | 0 | 0 | 0 | 1 | X | 0 | X | 0 |

0 = Output must be de-energised
1 = Output must be energised
X = Output - state is not critical (don't care)

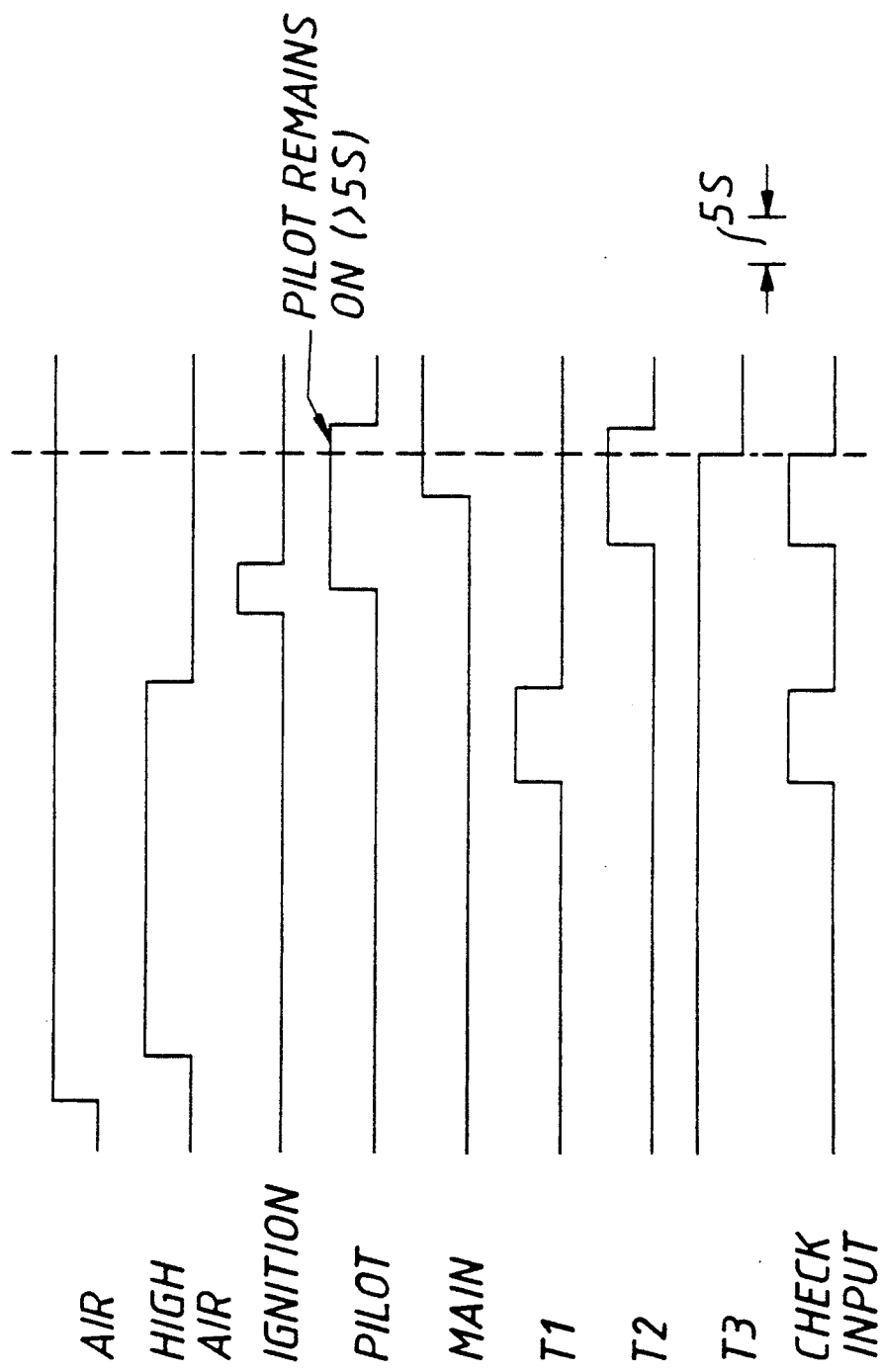

MONITOR SYSTEM

This application is a continuation of application Ser. No. 07/149,527, filed on Jan. 28, 1988, now abandoned.

BACKGROUND OF THE INVENTION

The invention relates to a monitor system.

In recent years microprocessor control systems have been used to control machines and systems because they are inexpensive and flexible.

When safety aspects have to be considered such as in burner control systems, inbuilt routines are used to help detect fault conditions in the systems they are controlling. Such a control system is disclosed in GB Patent Publication 2139782 for example. However, such systems can be subject to unpredictable failure modes because of the integral microprocessor control and so leave an element of doubt when used for safety critical applications.

The present invention is concerned with resolving such doubts to maintain safe operation even when unpredictable operational faults may occur.

SUMMARY OF THE INVENTION

According to the invention there is provided a monitoring system for monitoring a microprocessor based control device in safety critical situations, said system including: first input means for receiving control information from the microprocessor based control device; second input means for receiving reference information also received by said control device; means for determining whether the control information from said device corresponds to that expected in view of the reference information, and means for overriding the control information if any error in this control information is detected.

Preferably checking means are provided to ensure the integrity of the monitor system is maintained.

The system is preferably ROM based and received errors cause the memory to be addressed at a location containing overriding information.

BRIEF DESCRIPTION OF THE DRAWINGS

The invention will now be described by way of example with reference to the accompanying drawings in which:

FIG. 5 shows a table of operational conditions;

FIGS. 16 to 19 show timing diagrams.

DESCRIPTION OF THE PREFERRED EMBODIMENTS

Figure 1:
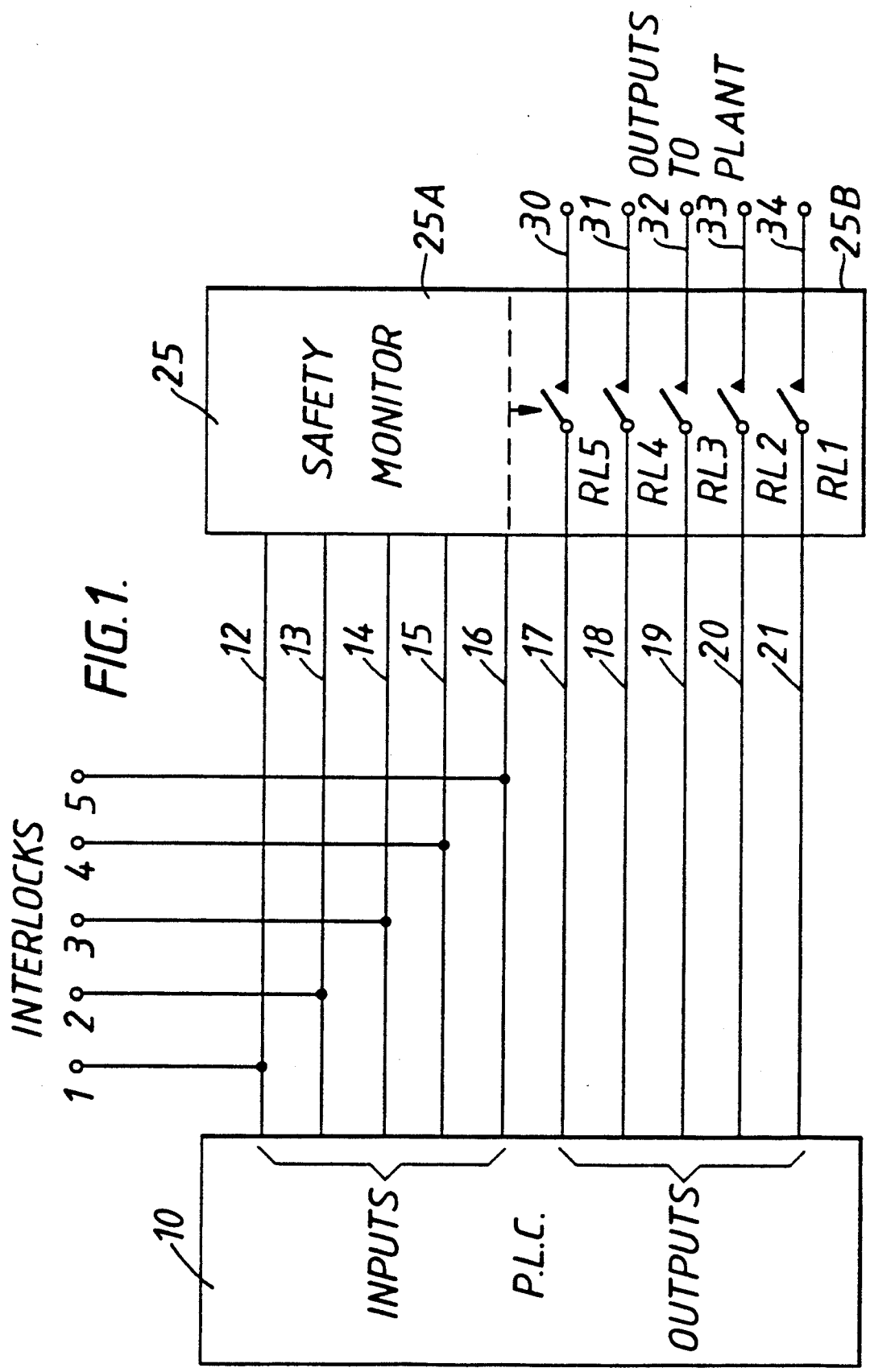
FIG. 1 shows the monitor in conjunction with a microprocessor control.

The FIG. 1 configuration shows a PLC (programmable logic controller) 10 which is microprocessor based and would normally directly control the operation of burner plant in dependence on the input signals received from interlocks 1-5. In this new configuration however, the control outputs from block 10 are not directly connected to the plant at terminals 30-34 but are connected in series with the safety monitor 25 using lines 17-21. The monitor also receives the interlock information via lines 12-16. The monitor can be broadly considered as having a first portion 25A which actually monitors the sequencing of the plant interlocks to check that the outputs from control 10 are as expected and if not then the monitor can itself initiate a control function to eliminate any potentially dangerous situation. The output control function is represented by the relay contacts RL1-RL5 of portion 25B. The monitor 25 is not provided to normally control the plant but to override control to initiate shutdown for example. Thus the monitor can be considered an 'active' monitor rather than merely being passive, as it can control the set of relay contacts RL1-5. This monitor contains the patterns for the PLC and expected plant outputs relating thereto at each stage of the sequence, e.g. pilot, ignition or fan operation dependent on thermostat and flame presence for example. If the monitor agrees with the status observed then it closes the appropriate relay contacts RL1-5 allowing the status of the outputs on lines 30-34 to mirror those received from the PLC. If the safety monitor dissagrees with the plant and PLC outputs then it will typically open all relay contacts initiating a plant shutdown in the event of PLC and plant interlock failures.

Figure 2:
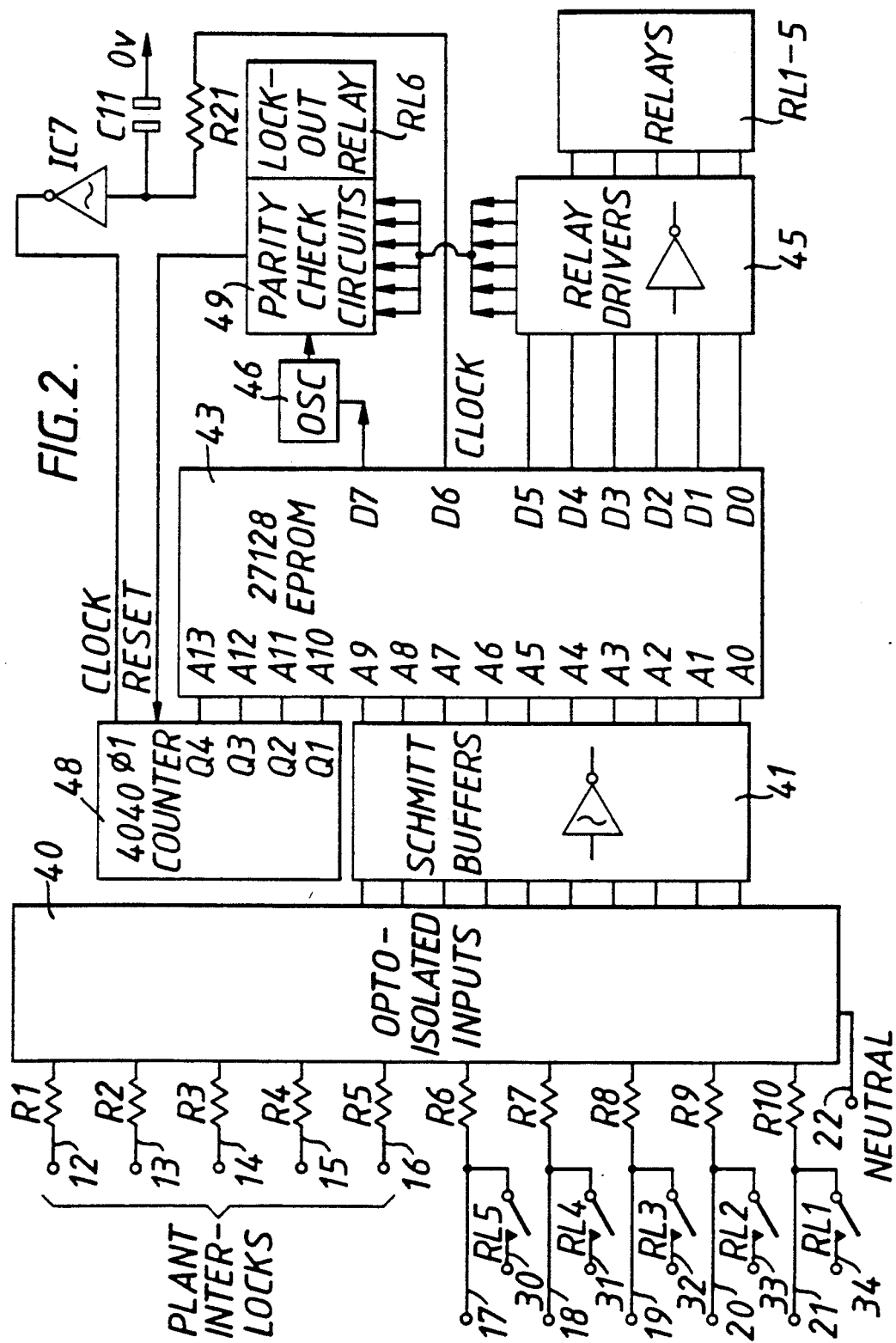
FIG. 2 shows an embodiment of the monitor in greater detail.
Figure 3:
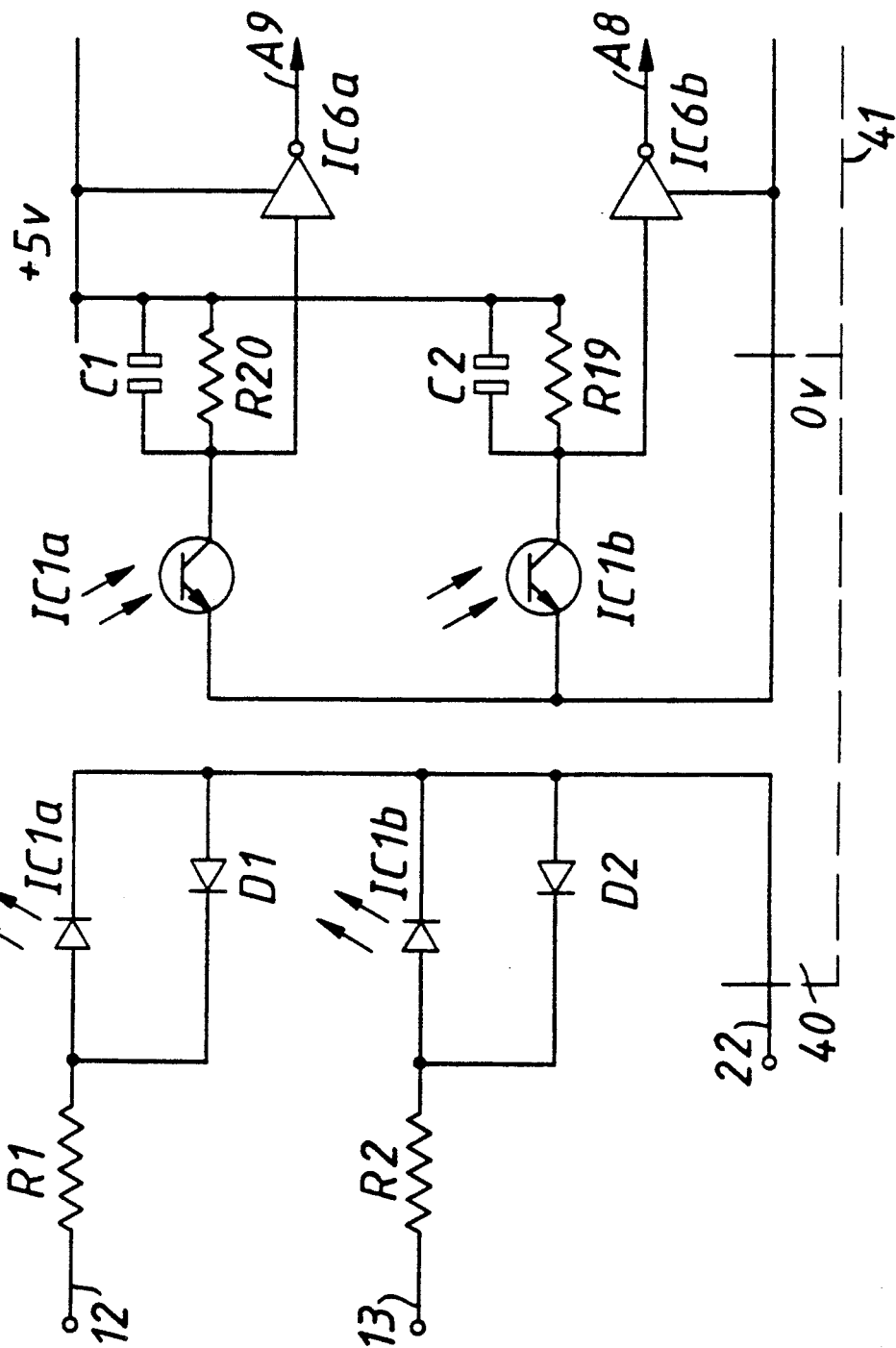
FIG. 3 shows the input handling configuration.

A more detailed embodiment of the monitor is shown in FIG. 2. The plant interlocks 1-5 of FIG. 1 and the PLC outputs are received as a.c. inputs on the lines 12-16 and 17-21 respectively and fed via resistors R1-R5 and R6-R10 to opto-isolator 40 (e.g. 5×dual opto-isolator type ILD 74). These resistors limit the current to a few milliamps which flows back through the common neutral 22. The isolated outputs are fed to buffers 41 prior to receipt by the EPROM 43 which is at the heart of the monitor system. One pair of opto-isolators with associated buffers is shown in more detail in FIG. 3.

Diodes D1 and D2 bypass the opto-isolator light emitting diodes (LEDS) forming part of the isolator chip IC1a on the non-conducting cycle of the a.c. input.

The collectors of each opto-isolator transistor forming the receiving part of chip IC1 feeds the input of the Schmitt inverted buffer (e.g. type 40106). When the input is active then the input to the Schmitt is pulled low by the conduction through the transistor. Also on the collector of each transistor is an RC network C1/R20 and C2/R19 connected up to +5 v. This serves two purposes The first is that it pulls the inputs of the Schmitt inverters up to supply rail (+5 v) potential. Secondly, because the inputs are a.c. then when an input is active, the opto-isolator collector is switching between 0 v and 5 v at the a.c. input rate. This would cause the Schmitt to be flipping between logic states. The RC network has a decay time chosen to be long enough to sustain the input to the Schmitt at low during the off periods, thus keeping the input active.

Similar opto-isolation and buffering is provided for all lines 12-21. The Schmitt inverters IC6a,b have an inbuilt hysteresis to remove noise on the lines to prevent spurious input state changes.

Returning to FIG. 2, the buffered inputs are received on address lines A0-A9 of the EPROM (e.g. type 27128 having 16 k locations).

Each location in the EPROM is accessible by a unique binary address code on the fourteen address lines A0-A13 and when a particular location is accessed the data at that location is placed in binary form onto the eight data lines D0-D7.

The EPROM is therefore essentially a large look-up table, into which can be stored the allowed operations of the PLC. The remainder of the EPROM can be stored with shutdown instructions. The use of the four remaining address lines A10-A13 is under the control of counter 48. The five plant loads can be controlled by data lines D0-D4 which are used via relay driver block 45 to energise the coils of relays RL1-RL5.

The data line D6 is used to clock counter 48 (e.g. type 4040). The clocking signal is fed via the RC network R21/C11 which filters out any spurious signals and the Schmitt inverter IC7 sharpens the signal and also helps to remove noise. The counter will only clock on a negative edge and so the clock data line has to change from a 0 to 1 in order to clock the counter on. The D7 reset line output is received via an oscillator 46 and this oscillator output is used by the parity check circuit 49 to ensure the EPROM 43 output and associated driver 45 output is not at fault as explained in more detail later. Any errors cause lockout relay RL6 to actuate.

The parity check circuit 49 operates dynamically as explained in more detail below, to ensure that all internal monitor circuits are correctly operating, hence the need to check signals from the EPROM via the relay drivers. A comparison bit D5 is provided for use in this check. Whether the counter 48 is incremented by a clock signal from D6 or a reset signal from D7 or merely is held at its present position will depend on the actual values stored in the EPROM for data positions D6 or D7 at any given time.

The lines Q1-Q4 of counter 48 are used to access the higher address lines of the EPROM 43 and these counter outputs give sixteen possible address states so effectively dividing the memory into 16 separate lookup tables, each table being accessed dependent on the address combination of A10 to A13 at any given time. Each table will have b 1 1 Kbyte allocated.

Each table will be accessed in sequence as each stage of the burner operation progresses. This sequencing is determined by a clock signal being available as stored data at location D6 at any given time. Using the EPROM as the source of clocking signals is a safety feature which prevents incorrect sequencing arising from the PLC or elsewhere. Within any one of the 16 tables, the actual locations accessed therein will be dependent on the address combination resulting from the signals lines A0-A9.

Hence the EPROM is accessed by a 14 bit word which is a combination derived from the counter, the plant interlocks and the PLC. If the combination is an 'allowed' one, i.e. not in error, then that accessed location will provide an 8 bit word on data lines D0-D7, which will have been prestored to correspond to the instructions received from the PLC.

An erroneous combination will define an address within the EPROM which will have prestored data which will be output to result in shutdown or other remedial action.

Figure 4:
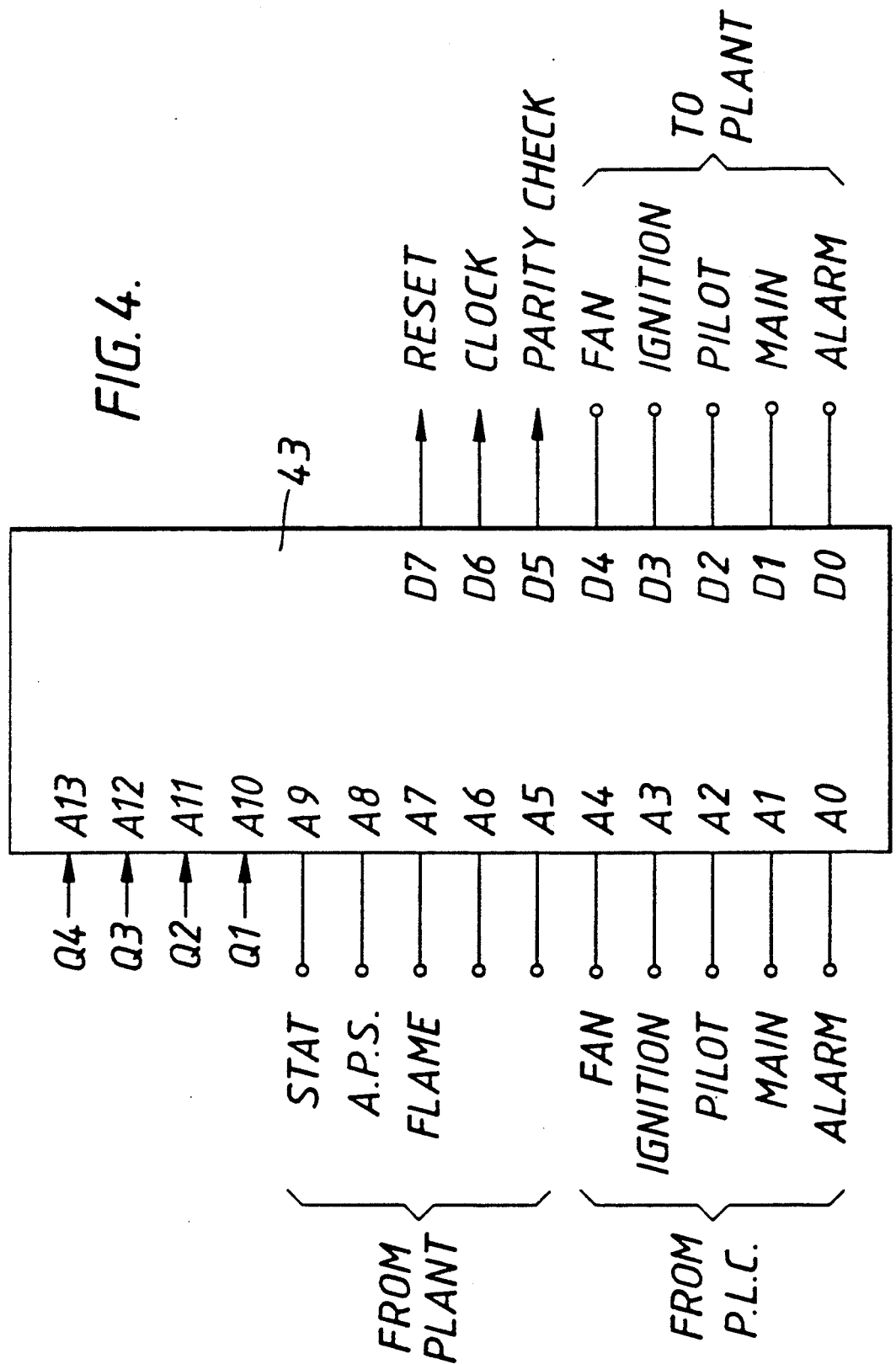
FIG. 4 shows the allocation of information with respect to the EPROM.

A typical combination used to define the EPROM address is shown in FIG. 4.

The plant interlocks Flame, APS (air pressure switch) and thermostat (Stat) are available to address lines A7-A9 respectively (via the opto-isolators and buffers of FIG. 2). Address inputs A5 and A6 are unused in this example. Control information from the PLC for alarm, main and pilot valves, ignition and fan operation is received at addresses A0-A4 respectively (via the FIG. 2 isolators and buffers).

The start-up sequence and operation for such a burner configuration is shown in the truth table of FIG. 5. This illustrates what states the PLC and plant outputs should be in at each stage of the burner sequence. The sequence commences from shutdown through start, purge, pilot ignition, main ignition to full running till a change in Stat condition resulting in post purge.

For normal operation, the EPROM will mirror the PLC outputs and changes of the various signals will cause different locations within a given area to be accessed. When a sequence step is due this will be carried out as a result of a clock signal being stored as data which is output to D6 for incrementing the counter.

The safety checks including parity check will now be described in more detail with reference to FIG. 6. There are various potentially possible failure modes within the monitor which are attributable to component failure. These could potentially be a logic gate failure, open or short circuit, or a bit corruption within a location of the EPROM. It is necessary to have a sufficiently fail safe circuitry within the safety monitor and this is achieved by means which include parity checking the data lines of the EPROM and relay drivers. A check is done on the data lines D0-D4 plus the comparison bit D5 of the EPROM. The parity circuit also checks the relay drivers for determination of failure, open or short circuit.

For an even number of bits in a data byte, even parity means that there are an even number of logic 1's and logic 0's in the byte. Odd parity refers to there being an odd number of logic 1's or 0's. This means that in all locations of the EPROM, a comparison bit D5 can be programmed to preserve one sense of parity, in the case of this monitor it is odd parity.

As already mentioned, the data lines DO to D5 are fed into relay drivers 45. The outputs of these relay drivers then go into the parity check circuit 49 as seen earlier from FIG. 2. The parity check circuit is dynamic which means in this embodiment that it is fed with a square wave signal from oscillator 46 which acts to check that all the gates of the parity check are continuing to work correctly.

Since the parity of the EPROM is constant, then the output of the parity check circuit will be constant. The output of the parity checking circuit will in fact be the same as the square wave input. The same square wave is also fed through a delay circuit 51 and the outputs of the delay circuit and parity check are combined in an exclusive OR gate IC13c.

The period of the square wave is approximately 350 µS. The delay circuit has a time delay of approximately 10 µS. The function of the exclusive OR is that when both inputs are the same level then the output of this OR gate will be zero, otherwise it will be at logic 1.

Figure 7:
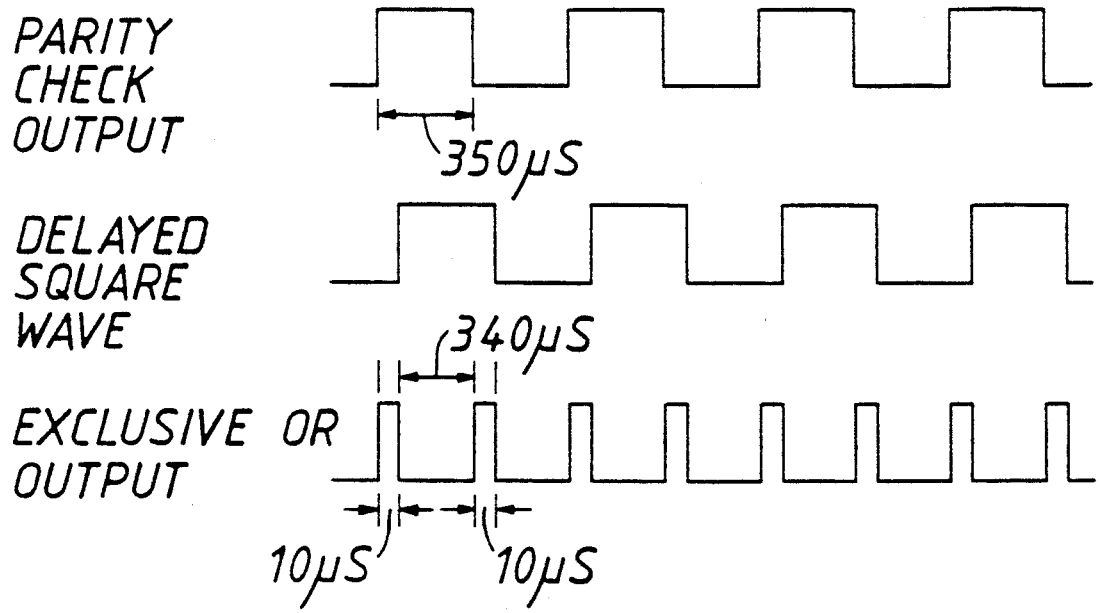
FIGS. 7 to 9 show signals associated with the monitor.
Figure 8:

The pulses emerging from this exclusive OR gate are shown in FIG. 7. These short 10 µS pulses seperated by approximately 340 μS pass into a relay driver IC11g which then drives the lockout relay coil RL6. The relay driver inverts the pulses from the exclusive OR gate. The mark to space ratio of the resulting signal makes it sufficiently positive to not allow the lockout relay to be energised. However, the signal keeps sufficient charge in the diode pump circuit 53 to keep the reset signal low, thus not resetting the EPROM. The signal is shown in FIG. 8.

Suppose now a bit failure occurs in the location of the EPROM being accessed which results in a parity error at that location. This will cause the output of the parity check circuit 49 to be inverted, which will consequently invert the output of the relay driver driving the lockout relay coil RL6.

Figure 9:

This signal, shown in FIG. 9, has a mark to space ratio which makes it sufficiently low to power the lockout relay coil, putting the safety monitor into lockout mode. Neither is it possible for the signal in FIG. 9 to be able to maintain sufficient charge in the diode pump circuit, and consequently the reset will go high. The counter 48 will be reset and therefore the EPROM will reset back to the start in the event of lockout.

It is possible that a fault could be caused due to the failure of a relay driver going open or short circuit.

Because the parity checking circuitry is dynamic, then any failure of any component will also result in lockout. So all the failsafe circuitry is itself integrally failsafe.

Figure 10:
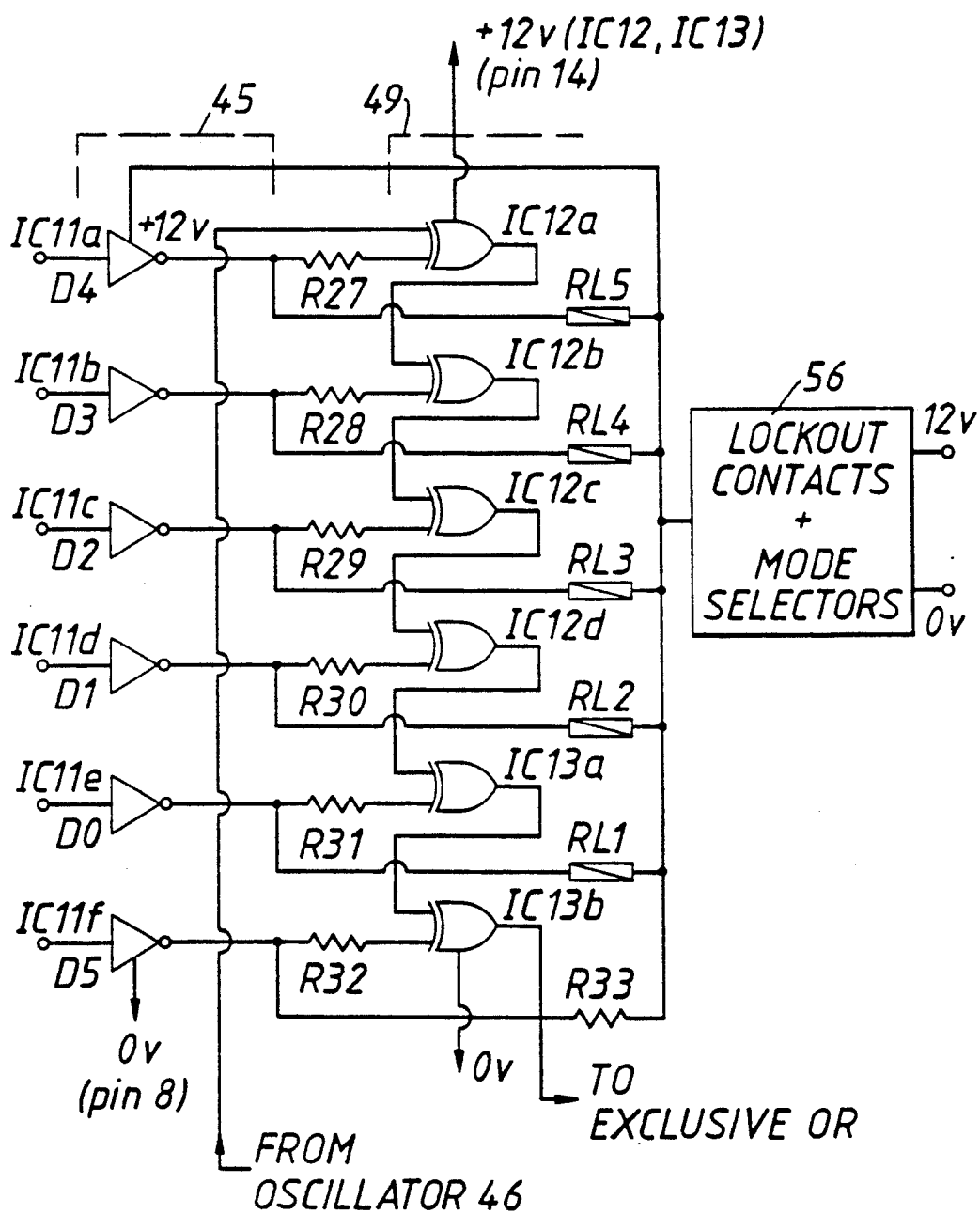
FIG. 10 shows parity circuit aspects in greater detail.

The relay driver and parity check configurations can be provided using the components of FIG. 10. The six buffer/drivers IC11a-f (e.g. type ULN 2003N) receive the EPROM outputs D5-D0 respectively and these are inverting so that any of the relays RL1-R15 will be driven when the output of the buffer goes low or the associated data line goes high. A lockout contact and mode selector block 56 is shown connected to the common connection for relays RL1-5 and provides the supply voltage selection to the relays as described shortly.

The parity check exclusive OR gates IC12a-d and IC13a-b (e.g. type 4070) are cascaded and have their respective other input connected via resistor R27-R32 to the relay drivers. The last exclusive OR IC13b has its output connected to the exclusive OR IC13c as just described with relation to FIG. 6. The oscillator 46 output is received at one input of IC12a to give the dynamic safety check.

So it can be seen that if the parity input is even then the output of the parity check circuit will be 0, and if odd then logic 1. However, because of the square wave from the oscillator, the output changes continually at the oscillator rate and so exercises all gates to detect potential faults. The failure of any one gate will be detected by the loss of the square wave signal at the output of the parity check circuit. Thus the parity circuit is itself failsafe.

Figure 6:
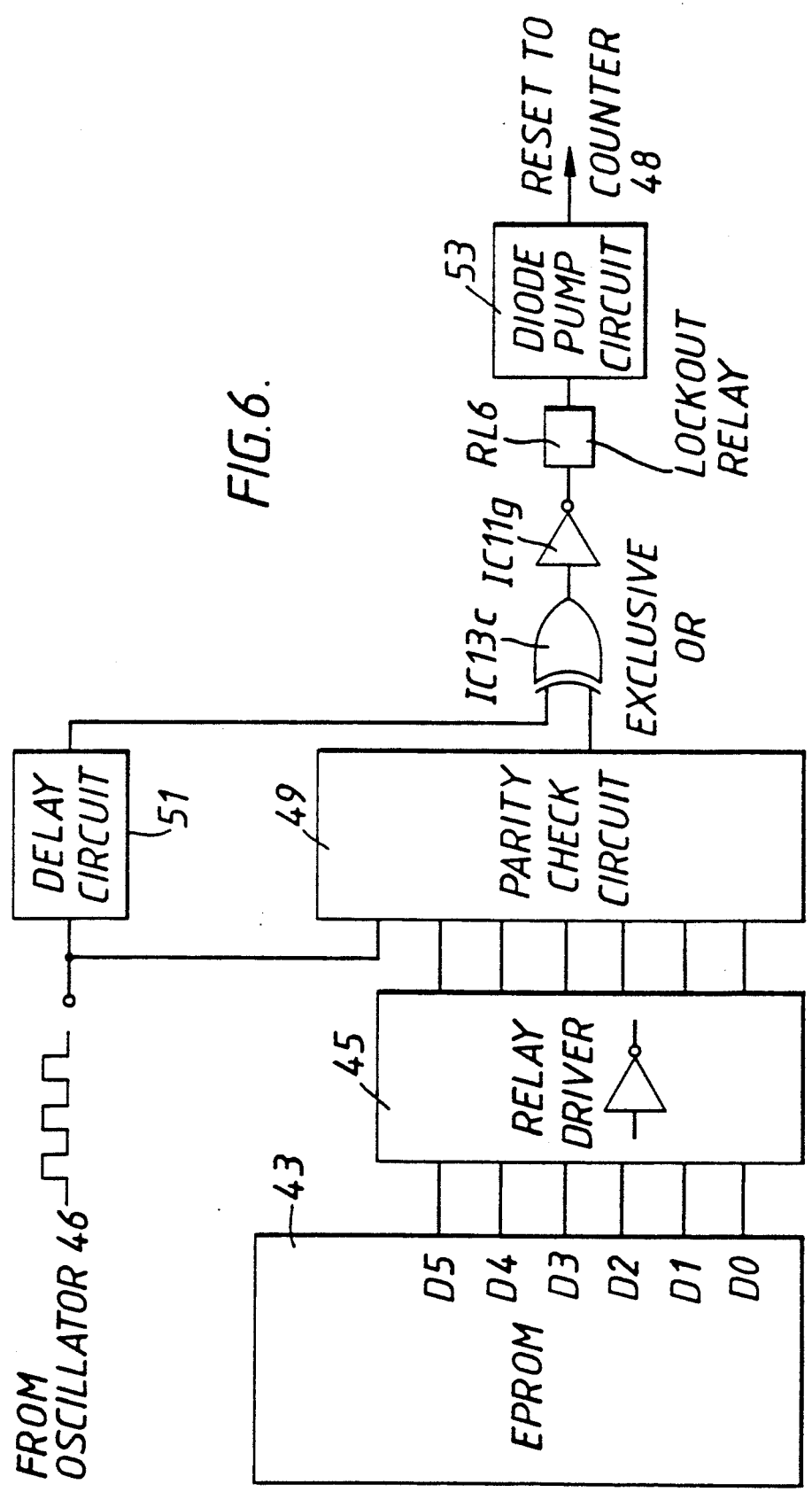
FIG. 6 shows parity check aspects.
Figure 11:
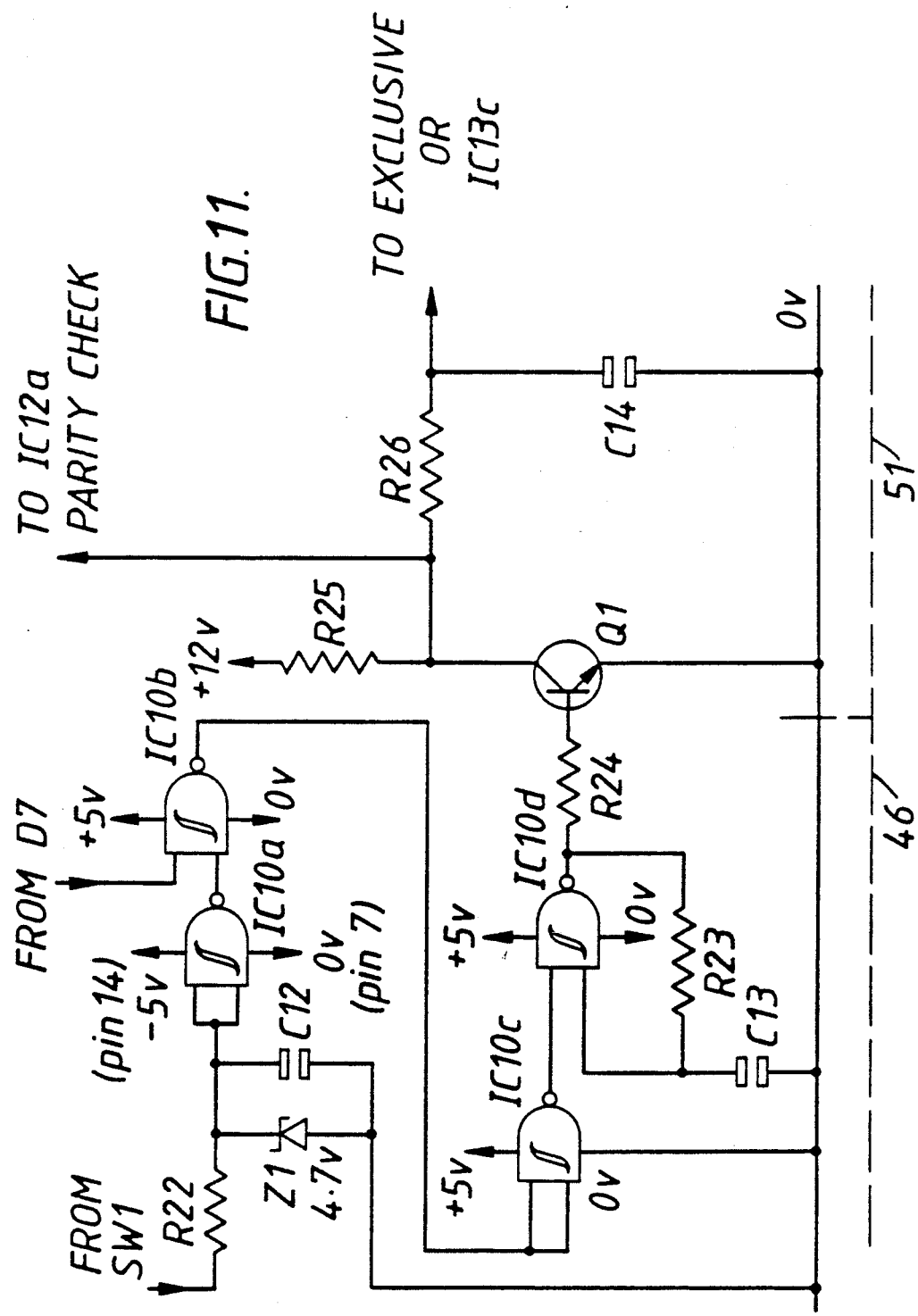
FIG. 11 shows oscillator and delay circuit details.

FIG. 11 shows a suitable oscillator 46 and delay 51 already mentioned in respect of FIG. 6.

The oscillator is formed by NAND gate IC10d (e.g. type 4093) and R23 and C13. The output is available via R24 and transistor Q1 having a collector resistor R25. The oscillator output passes both to the parity check circuit 49 and the delay circuit 51 formed by the RC network of R26 and C14 giving a time constant of approximately 10 μS. The oscillator can be enabled and disabled by the EPROM data output D7 which passes via NAND IC10b and IC10c (this latter connected as an inverter) The delayed oscillator output goes to exclusive OR IC13c as already described in FIG. 6 and now shown in detail in FIG. 12. This gate also receives the oscillator output that has passed through the gates of the parity check circuit. After inversion via driver IC11g the signal passes through the winding of reset coil RL6 and the diode pump via transistor Q2. The pump comprises R34, C15-16 and D11-12 and R35-36 acting as a potential divider. The output passes to reset the counter 48 via Schmitt inverter IC7f (e.g. type 40106).

During normal non-lockout operation of the circuit the transistor Q2 spends the majority of its time turned off, and a relatively very short time turned on. Both these periods are determined by the oscillator frequency and the delay circuit time constant. During the on period capacitors C15 and C16 will charge up through Q2.

Capacitor C15 is approximately half the capacitance of C16 and so C15 will charge up to approximately twice the voltage on C16. During the long off period C15 will discharge through R34 and D11. C16 will discharge slowly through R35 and R36. However, when Q2 turns back on again it will start to charge C15 and C16 back up again. This results in charge being dumped across from C15 to C16, therefore increasing the volts across C16. So, on each 'on' cycle of Q2 the charge on C16 is ramped up, therefore, increasing the volts on C16, to a level sufficient to keep the input voltage to IC7f high enough so as not to give a reset.

However, when the signal into the base of Q2 is inverted so as to give a lockout condition, then Q2 spends the majority of its time turned on, and a relatively short time turned off. This means that C15 and C16 have very little time to discharge. When Q2 turns back on again, very little charge is transferred into C16, so the voltage on C16 remains low and hance the input to IC7f is low, instigating a reset signal to the counter. The same effect would occur if Q2 spent all its time off, or all its time on.

If Q2 was permanently off C15 and C16 would eventually fully discharge leaving zero volts on the input to IC7f, so instigating a reset. This is the case when the EPROM disables the oscillator via its data line D7. When Q2 is permanently on, i.e. when a lockout occurs, no charge is transferred to C16. The voltage on C16 remains low thus causing a reset.

In addition the EPROM output on data line D7 will reset the counter when the D7 output goes low. This is achieved by disabling the oscillator (see FIG. 11) via the NAND gate IC10b (e.g. type 4093) and the gate IC10c (connected as an inverter). If the oscillator is disabled then the square wave is removed and this causes the output of IC7f again to go high and reset the counter. The capacitor C16 and the resistors R35-R36 provide filtering to prevent spurious reset signals due to noise. R35-36 also act as a potential divider.

Figure 12:
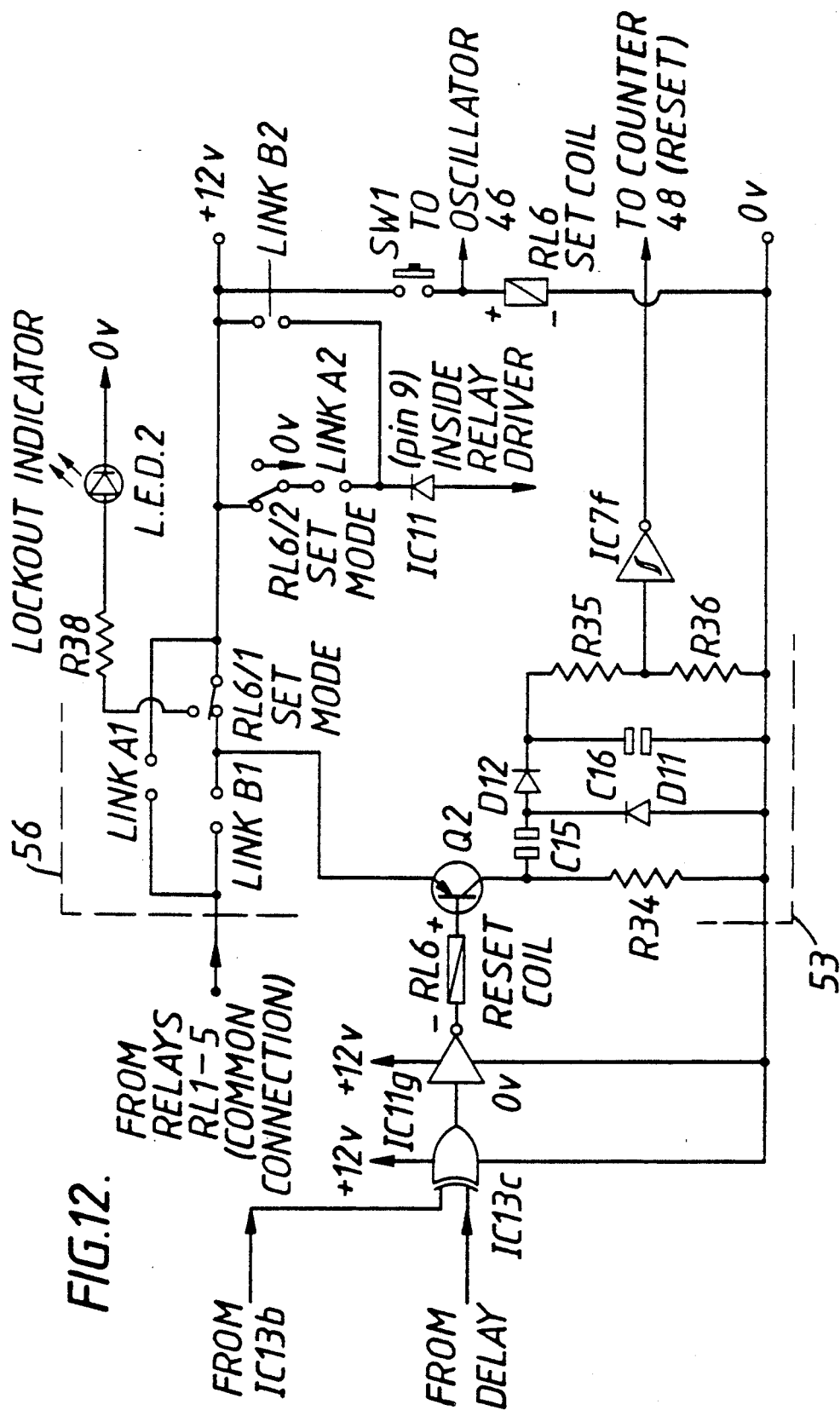
FIG. 12 shows lockout circuit aspects.

A manual reset can be provided at switch SW1 of FIG. 12 and this acts to disable the oscillator of FIG. 11.

The zener diode Z1 clamps the voltage to inverter IC10a to 4.7 v. This is inverted to logic 0 and this disables the oscillator, and this passes via the diode pump to cause the output of IC7f of FIG. 12 to go high so resetting the counter. The switch SW1 of FIG. 12 can also be used to actuate the reset coil of RL6 after a lockout condition.

There are two possible lockout modes dependent on the selection of the links shown in FIG. 12. As already discussed, the exclusive OR gate IC13c compares the output of the parity check circuit and the delay circuit.

IC11g then inverts the signal and drives the latching lockout relay reset coil. There are two modes of lockout selectable by links A1-2 and B1-2. The diode associated with these links is contained within chip IC11.

If links A1 and A2 are selected (made) then in the event of a monitor fault, e.g. a bit corruption in an EPROM location, then the relays RL1 to RL5 are all energised and so their contacts are closed allowing total PLC CONTROL OF THE PLANT. The monitor is effectively bypassed due to its own internal fault, but the PLC continues to control the plant.

Alternatively, if links B1 and B2 are selected then a monitor fault, such as the one mentioned above, will give plant shutdown, preventing PLC control of the plant. This is because all the relays will drop out isolating the PLC and initiating shutdown.

The latching relay will remain in this lockout state until the set coil of RL6 is powered and so returning to normal operating mode by manually actuating switch SW1 once the fault has been removed. A lockout indicator LED2 with an associated current limiting resistor R38 provides visual indication of lockout.

PLC error will result in reset and hence plant shutdown but not lockout, so the above modes do not affect the action of the monitor when a PLC fault occurs. A standard regulated mains power supply can be used to provide the 5 v and 12 v d.c. supplies.

As already described with relation to FIGS. 4 and 5, the EPROM within the monitor system will mirror the PLC outputs normally associated with the burner status at any given time (except when the PLC is experiencing a fault condition).

Figure 13:
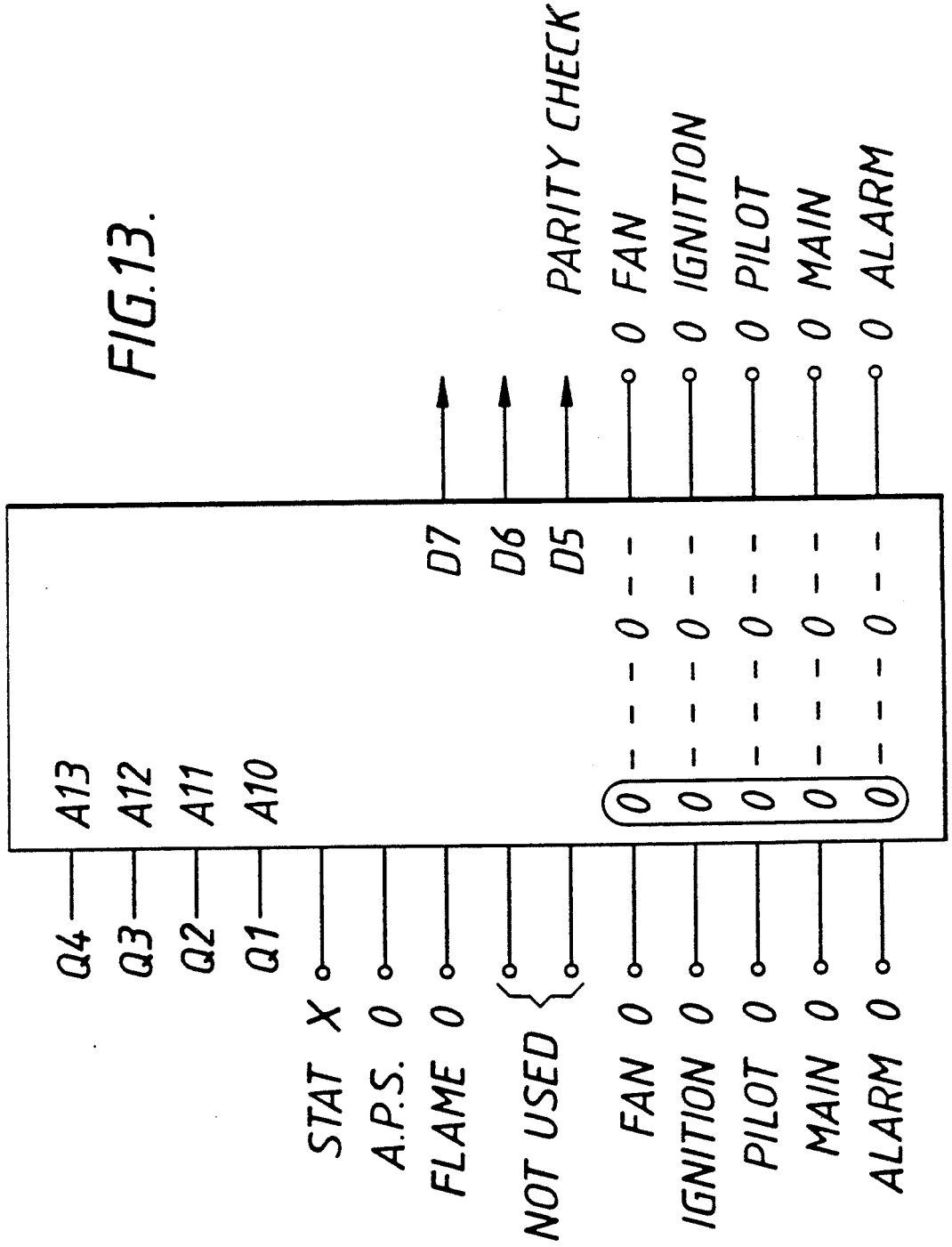
FIG. 13 shows input and EPROM output for shutdown.

FIG. 13 shows this mirrored output in the EPROM. The 5 inputs from the PLC correspond to the shutdown status and are equivalent to all binary zeros. APS and Flame will be zero and STAT may or may not be closed (represented by X). This corresponds to the first line of the table shown in FIG. 5.

As already discussed, counter 48 output Q1-Q4 will control which of the 16 possible areas of the EPROM is accessed.

Within the given area the specific location is determined by the 10 bit word (or more correctly by the 8 variable bits of this word—A5 and A6 do not change). These 8 bits are defined by A9-A7 and A4-A0, viz STAT, APS, Flame, Fan, IGN, Pilot, Main and Alarm.

Figure 14:
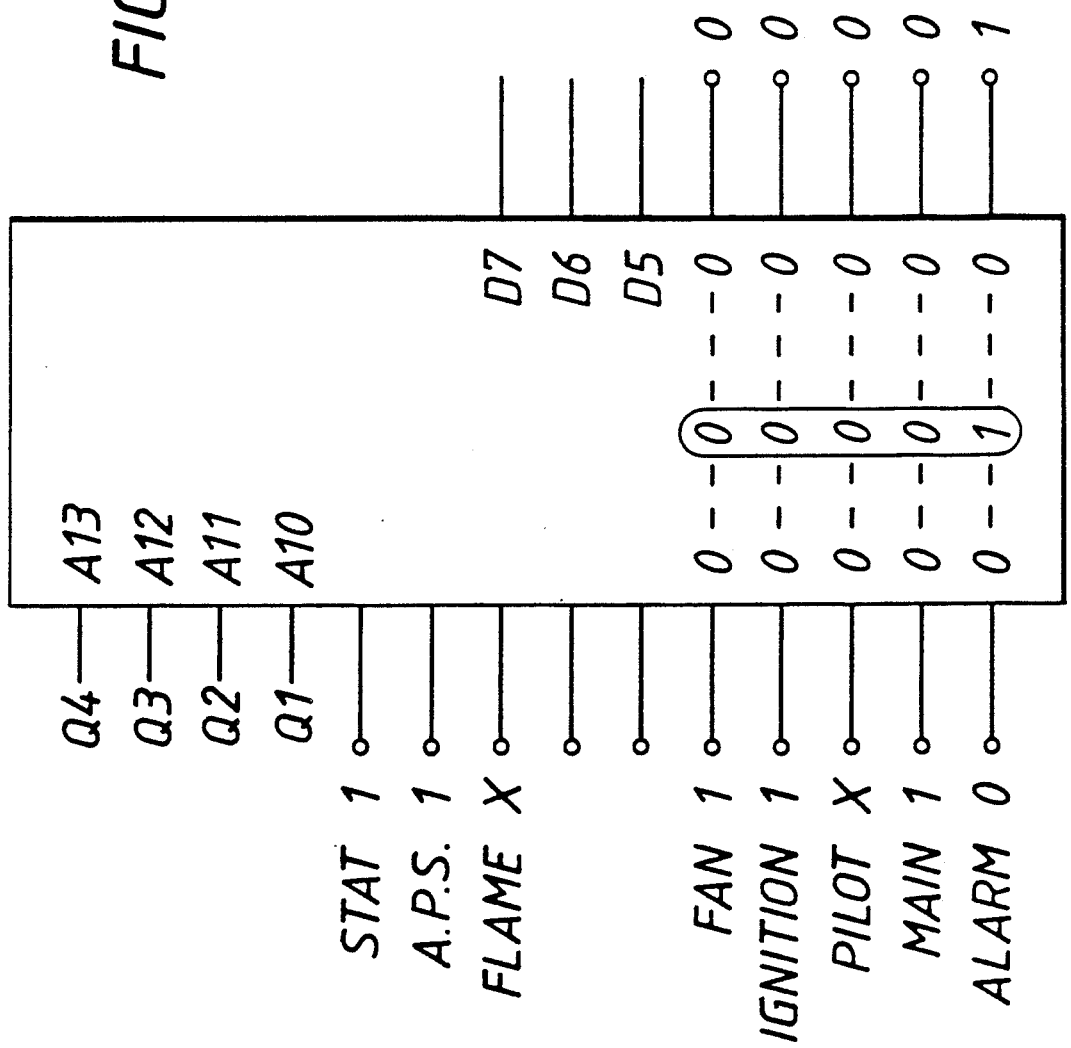
FIG. 14 shows a Main error from the PLC.

The data prestored at the defined location will be all zeros for D0-D4 as shown in FIG. 13—to mirror the PLC. FIG. 14 shows an example of a situation when the PLC output is in error. This illustrates a fault condition where the Main output is erroneously energised during the pilot ignition stage, which is obviously highly undesirable.

This energising is represented by the logic 1 at the Main output received from the PLC. It is shown that Alarm is 0 (illustrating that the PLC itself has failed to notice this fault). Other inputs correspond to those of line 5 of FIG. 5.

The location within the EPROM will have prestored data as shown in FIG. 14 where all zeros are present except in the D0 (alarm) location. These zeros will cause the relays RL1-5 to open so de-energising the plant for example, as represented in FIG. 1. The monitor can thus be seen to have safely dealt with a potentially dangerous situation.

Figure 15:
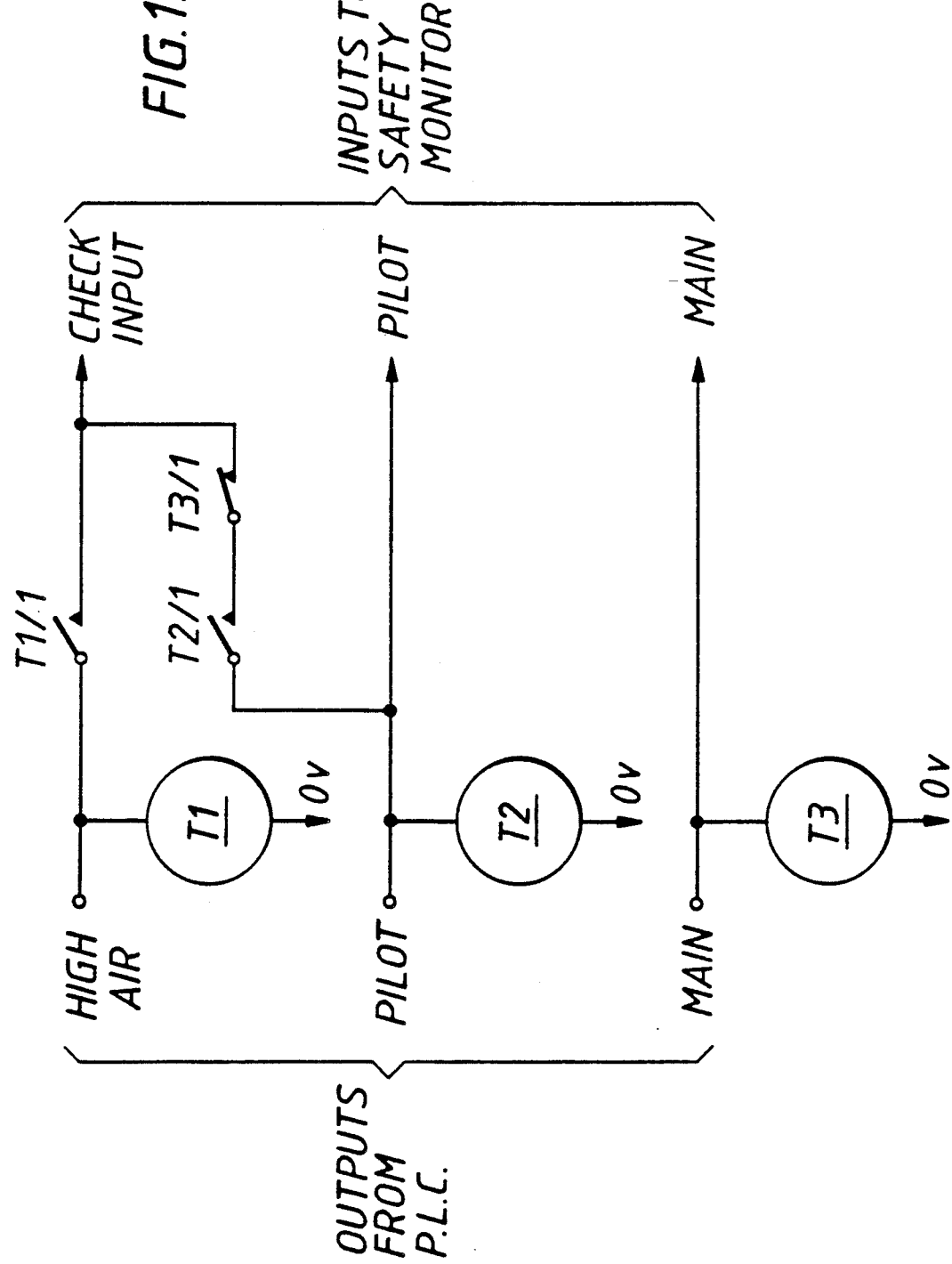
FIG. 15 shows a timer configuration.

As discussed above, the A5 and A6 inputs to the EPROM have not been used. In an expanded version of the monitor system one or both of these can be employed to ensure that minimum or maximum timing of events within the burner sequences are within desired limits. To achieve this, external timers can be connected to the monitor system as shown in FIG. 15.

Three timers T1,T2,T3 are incorporated and are powered from the high air proving switch, the pilot valve supply and the main valve supply respectively.

The timer T1 will check that the minimum purge time is satisfied, say 30 seconds. Timer T2 will check that the maximum time for pilot ignition is not exceeded. Timer T3 will check that the Main ignition time does not exceed the maximum allowed time.

When the high air limit switch on the modulating unit makes, the timer T1 is powered. After 30 seconds, the timer will time out and the contact T1/1 will close. This will then set the check input to logic 1 (active). The check input going to a logic 1 can then be used as a check that the purge time was at least 30 seconds duration. This is illustrated in the FIG. 16 waveforms. The EPROM can thus be pre-programmed with the correct state of the check input at each stage of the burner sequence. If there is a discrepancy, appropriate action can be initiated.

If the high air purge is less than the minimum time then power will be taken off T1 before it can time out, so the check input will not go high. The check input can be used as a clocking condition, so that if incorrect timing results, the EPROM is accessed at the wrong location, and shutdown will result.

Figure 17:
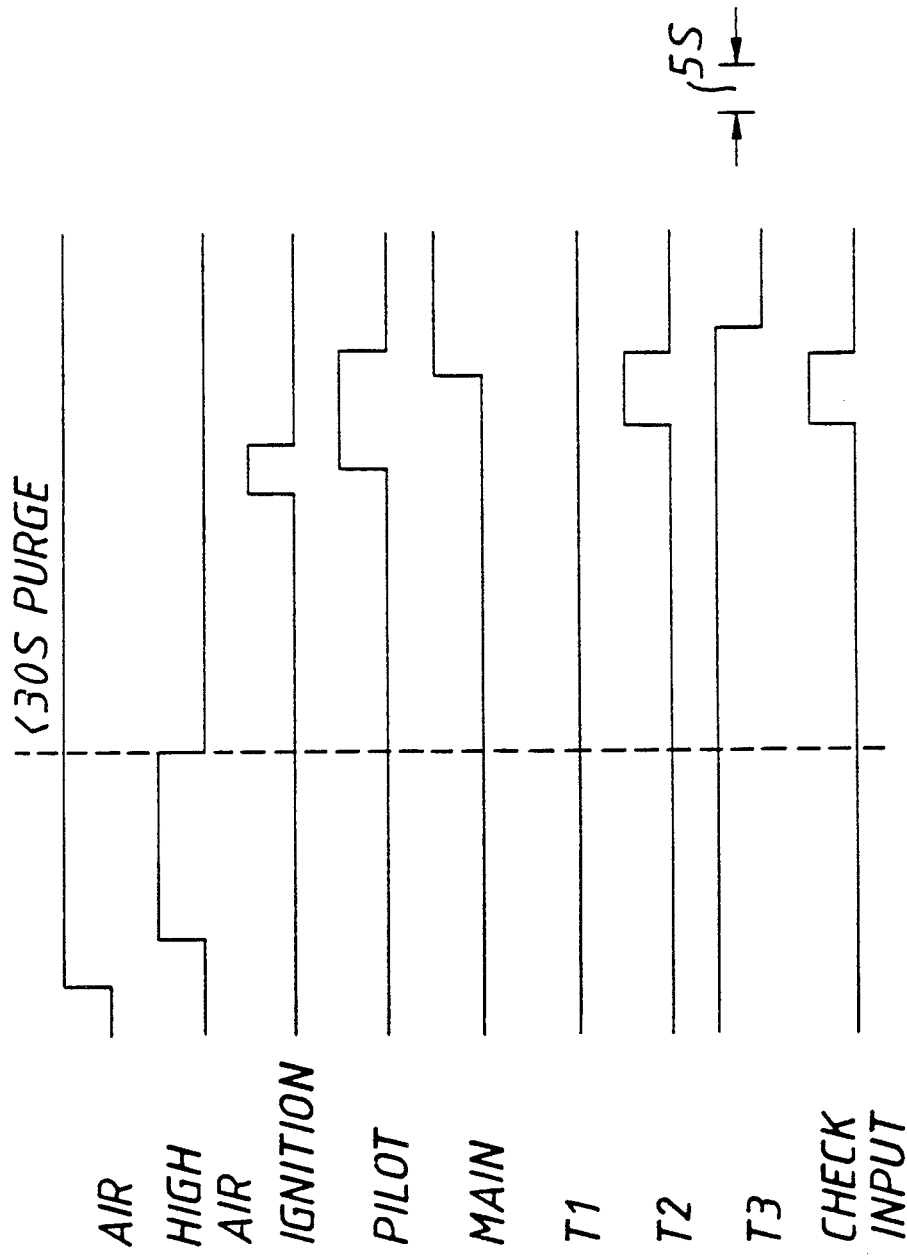

This is illustrated in FIG. 17. Here, because the check input has not gone high, the EPROM will not be stepped on. This has therefore checked the length of the purge.

Figure 18:
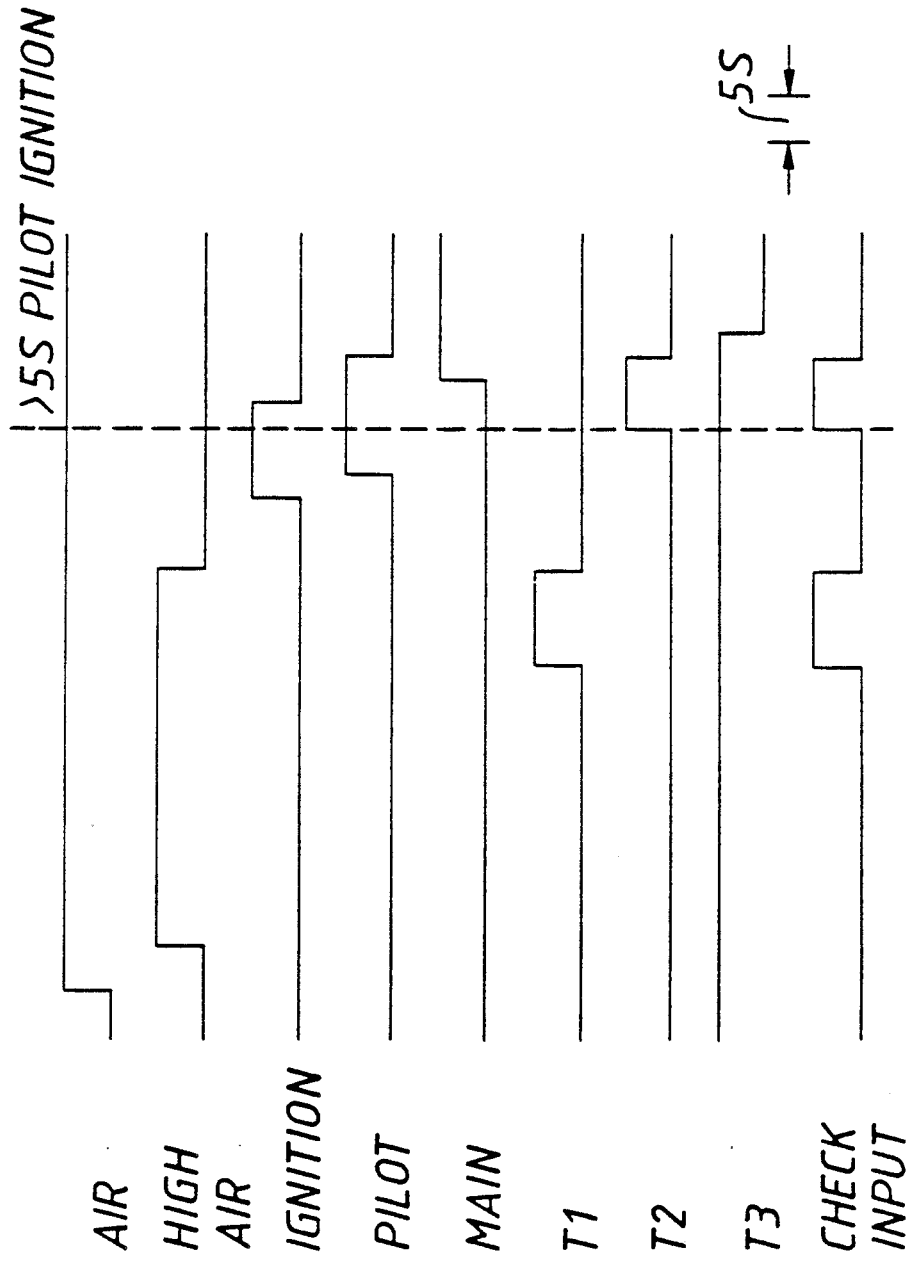

The next time that can be checked is the pilot ignition time to confirm it does not exceed 5 seconds. FIG. 18 shows the effect of an extended pilot ignition time. The ignition is on at the same time as the check input which means the pilot ignition period has exceeded 5 seconds.

This address can be pre-programmed as disallowed in the EPROM, and can contain a shutdown instruction. If the pilot ignition period is less than 5 seconds then the address word would be allowed, as shown in FIG. 16.

Figure 16:
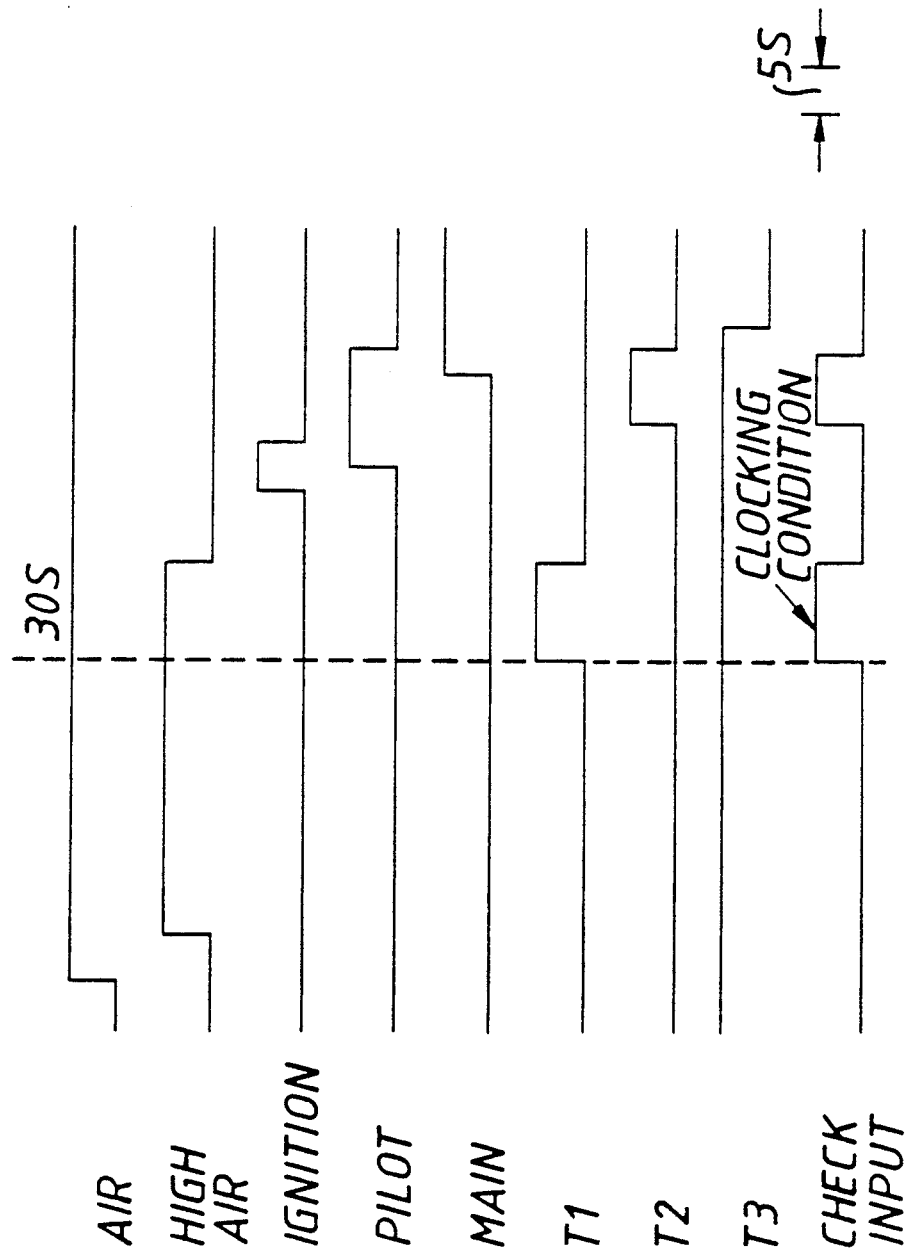

The Main ignition time can be checked on timer T3 as seen from FIG. 16. This timer is energised when the main valve output is energised and will then time out after 5 seconds, by which time the pilot should have been extinguished. However, if the pilot stays on for longer than 5 seconds, then when timer T3 times out, the pilot output will still be energised. This is shown in FIG. 19. This can be pre-programmed as a disallowed address and so contain a shutdown instruction.

This configuration has thus checked the purge time, pilot ignition time and the Main ignition time.

The timers can be configured by standard preset solid state timers. If any timer should fail then any error will be picked up by the check input of the EPROM address line and appropriate action instigated.

The EPROM used in the monitor system can be pre-programmed with data at its various locations using standard techniques or by the use of a short program.

We claim:

1. A monitor system for monitoring a microprocessor based control device having an output for effecting control of a system by means of control information therefrom in dependence on reference information received from system sensors of physical parameters in safety critical situations, said monitor system being configured without the requirement of a further microprocessor and including first input means for receiving said control information from the output of the microprocessor based control device; second input means for receiving reference information from the system sensors;

memory means having address inputs continuously receiving both the control information and the reference information form the first and second input means respectively to define in combination an accessed memory address wherein the contents of said accessed memory address is used for continuously determining whether the control information from the device corresponds to that expected in view of the reference information; and means for overriding the control information if any error in this control information is detected.

2. A system as claimed in claim 1, including generator means connected to said memory means for generating an output connected to the address inputs, and wherein the memory means is provided for storing binary data accessible when addressed at the address inputs in dependence on the output of the generator means and the control and reference information received form the first and second input means, respectively and for outputting data for overriding the control information if an error in the control information occurs.

3. A system as claimed in claim 2, including feedback means connected between an output of the memory means and the generator means for updating the output of generator means in dependence on data stored within the memory means so as to address locations within the memory at locations defined by the output of the generator means and both the control and reference information in combination.

4. A system as claimed in claim 1, wherein the memory is configured to contain information mirroring the control device information and to contain overriding information, the information mirroring the control device information being located at addresses accessible during normal operation of the control device and the overriding information being located at addresses accessible during an error phase of the control device.

5. A system as claimed in claim 4, including selector means, and wherein the memory has sufficient capacity to store additional sequencing information for receipt by the selector means to cause different memory areas to be made available to the control device information and reference information.

6. A system as claimed in claim 5, wherein the selector means includes a counter and the memory includes a data bus, and wherein feedback means are provided from the data bus of said memory to reset or increment the counter in dependence on preprogrammed instructions within selected memory storage locations.

7. A system as claimed in any of one of claims 1, 2, 3, 4, 5 or 6, wherein the first and second input means include opto-isolators for electrically isolating the inputs and including buffers for converting the inputs to a level suitable for the address bus of the memory.

8. A system as claimed in any one of claims 1, 2, 3, 4, 5 or 6, wherein the second input means is configured to receive thermostat, air status input and flame presence information from a burner device.

9. A system as claimed in any one of claims 1, 2, 3, 4, 5 or 6, wherein the first input means is configured to receive fan, ignition, pilot, main, and alarm information from the control device for burner control.

10. A system as claimed in any one of claims 1, 2, 3, 4, 5 or 6, including checking means provided to ensure the integrity of the monitor system is maintained.

11. A system as claimed in claim 10, wherein the checking means includes a dynamically operable check circuit for continually checking system integrity.

12. A system as claimed in claim 11, including a controllable oscillator for dynamically exercising parity of the check circuit and a lockout device for initiating operational lockout in the event of a detected failure.

13. A system as claimed in claim 12, wherein the oscillator is controlled by an output provided by the memory means.

14. A system as claimed in claim 12, including at least one relay and a relay operating circuit under the control of a signal derived from the oscillator to establish the integrity of the at least one relay.

15. A system as claimed in claim 14, wherein the at least one relay includes a bistable lockout relay having a first coil for effecting a lockout condition on receipt of an error detection signal from the parity check circuit, said relay being resettable by means of a second coil.

16. A system as claimed in any one of claims 1, 2, 3, 4, 5 or 6, including relay means for interrupting the passage of control information from the control device to a remote location in dependence on an output derived from the memory means.

17. A system as claimed in claim 16, wherein the relay means are provided to by-pass the monitor in the event of monitor failure.

18. A system as claimed in any one of claims 1, 2, 3, 4, 5 or 6, including timer means for providing reference sequencing information for use by the memory means.

19. A monitor for independently monitoring a microprocessor based control device provided to control a system in safety critical situations, said microprocessor based control device having an input for receiving reference information from system sensors of physical parameters and an output for supplying control information to said system in dependence on said reference information from said system sensors, said monitor including first input means for receiving the control information for the system control from the microprocessor based control device; second input means for receiving the reference information from the system sensors, memory means for continuously receiving both the system control information and the reference information from the first and second input means respectively, and generator means connected to an input of said memory means for generating addresses to define an accessible memory address in combination with the control information and the reference information wherein the contents of said address memory is used for continuously determining whether the control information from the said device corresponds to that expected in view of the reference information; and means for overriding the control information for the system control if any error in this control information is detected.

20. A monitor as claimed in claim 19 wherein the monitor is connected in series with the microprocessor based control device and the memory means is configured to contain information mirroring the control device and to contain overriding information, the information mirroring the control device information being located at addresses accessible during normal operation of the control device as defined by the generator means, the system control information and the reference information in combination and the overriding information being located at the addresses accessible during an error phase of the control device.

21. A monitor as claimed in claim 19 or 20, wherein said generator means including a counter having an address output and the memory means includes a data bus, and wherein feedback means are provided from the data bus of said memory means to reset or increment the counter output in dependence on preprogrammed instructions within memory storage locations selected in dependence on a combination of the control information, reference information and counter output.

22. A monitor as claimed in claim 21 including checking means provided to ensure the integrity of the monitor system is maintained, said checking means including a dynamically operable check circuit for continuously checking system integrity in response to data stored within the memory means.

23. A monitor as claimed in claim 22, wherein the check circuit includes a parity check output and a controllable oscillator is provided for dynamically exercising the parity of the circuit and effecting a lockout device for initiating operational lockout in the event of a detected failure.

24. A monitor as claimed in claim 23 including at least one relay and a relay operating circuit under the control of a signal derived from the oscillator to establish the integrity of the at least one relay, at least one relay including a bistable lockout relay configuration having a first coil operable to a lockout condition on receipt of an error detection signal from the check circuit, and said relay being resettable by means of a second coil.

25. A monitor as claimed in claim 24, wherein the first input means is configured to receive control information for controlling a fan, ignition, pilot and main burners and wherein the second input means is configured to receive thermostat, air status input and flame presence information from a burner device.

26. In a burner system having a plurality of sensors for providing reference information indicative of the status of the burner system and a microprocessor based control device for receiving reference information, said device including an output for providing control information to control burner operation in dependence on the reference information, the improvement comprising a monitor device having first input means for receiving the control information controlling burner operation, second input means for receiving the reference information indicative of burner status, memory means for continuously receiving both the control information and the reference information for the purpose of selecting memory addresses within said memory means for measuring physical parameters from the first and second input means respectively and wherein the control units of said selected address within said memory means is used for continuously determining whether the control information from said control device corresponds to that expected in view of the reference information, means for overriding the control information if any error in this control information is detected and means for checking the integrity of the memory means to ensure correct operation thereof is effected, said means for checking the integrity of the memory means including feedback means connected between an output of the memory means and an input thereto, said memory input being configured to receive addressing information dependent on information stored within the memory means together with the control information and reference information from the first and second input means to define an accessed memory address.

27. A system as claimed in claim 26, wherein the first input of the monitor is connected to receive burner control information from the control device for effecting control of a fan, ignition, pilot burner or main burner.

28. A system as claimed in claim 27, wherein the second input of the monitor is connected to receive reference information on thermostat, air or flame presence status.

29. A system as claimed in claim 26, 27 or 28, wherein the memory means of the monitor contains stored information including a first set of information mirroring the control device information and a second set of information containing overriding information, the overriding information being located at addresses accessible during an error phase of the control device.

30. A system as claimed in claim 26 wherein the means for checking the integrity of the memory means includes a parity check circuit and includes output means connected to said memory means to receive a periodic data bit therefrom to exercise the parity check circuit to ensure no erroneous operation of the memory or the parity check circuit is occurring.

* * * * *